Patented Apr. 24, 1934

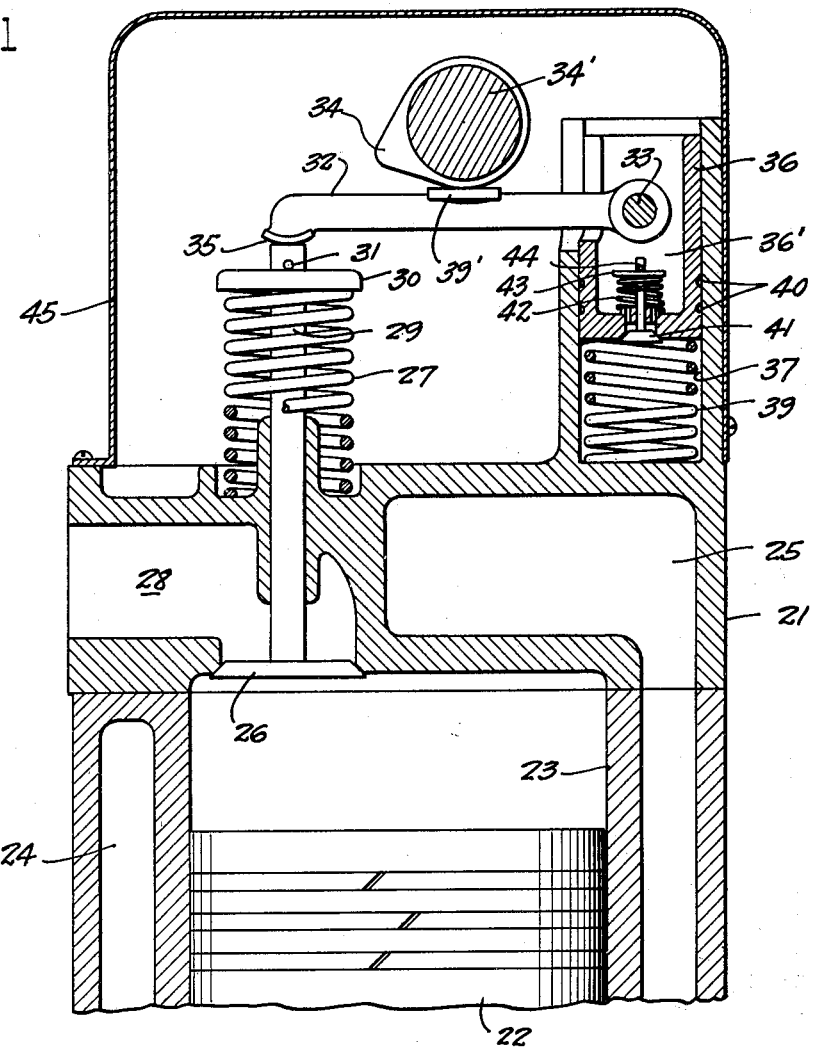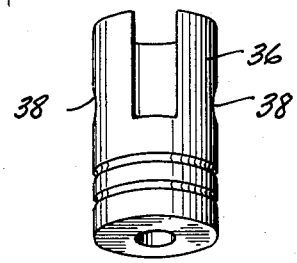

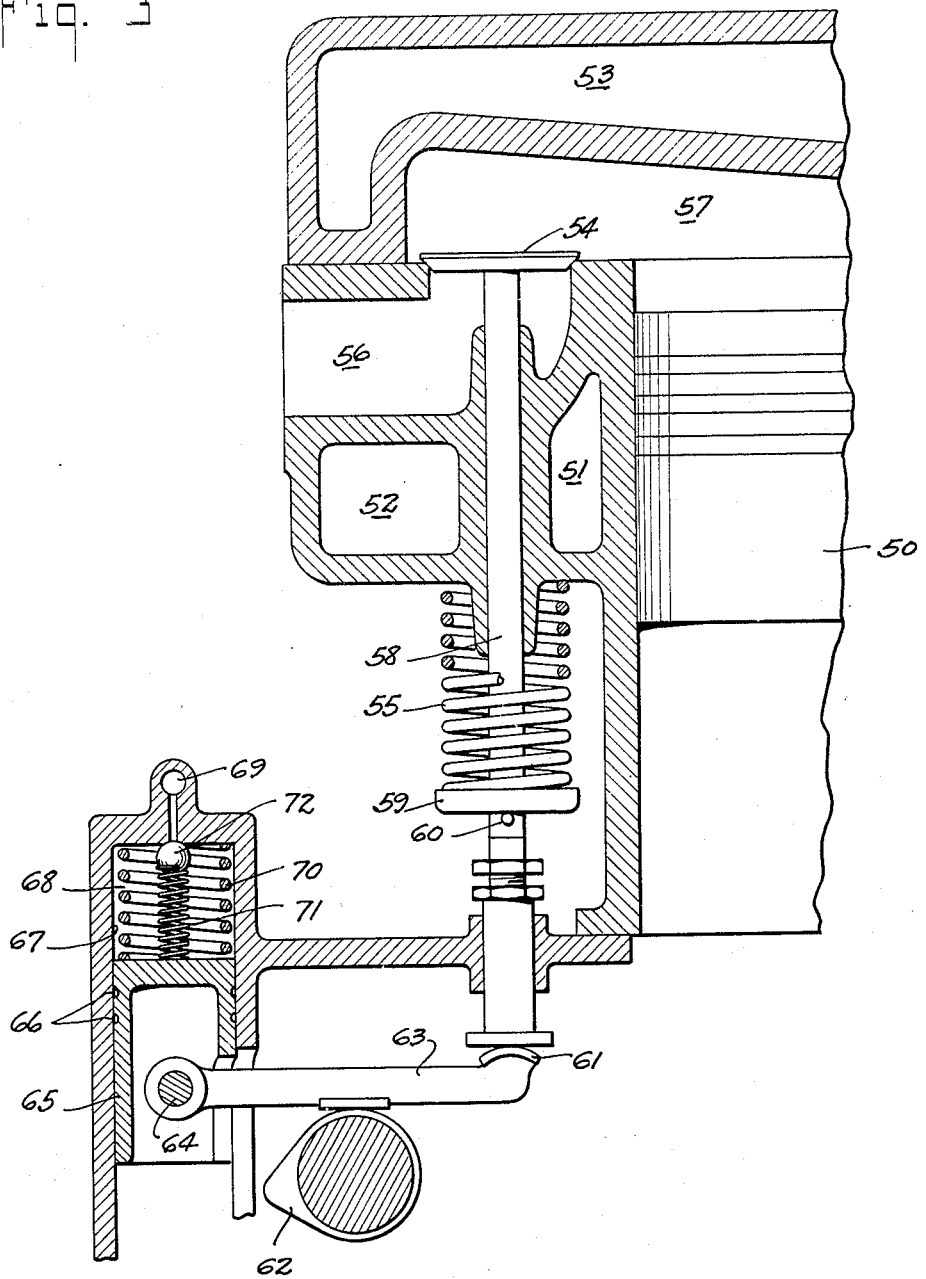

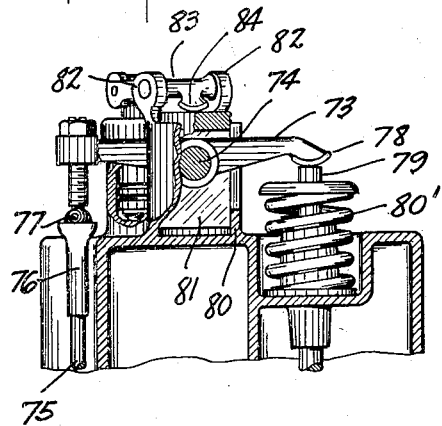
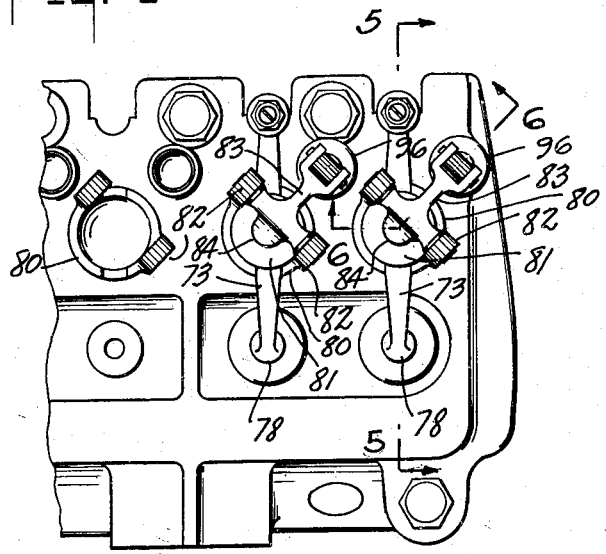
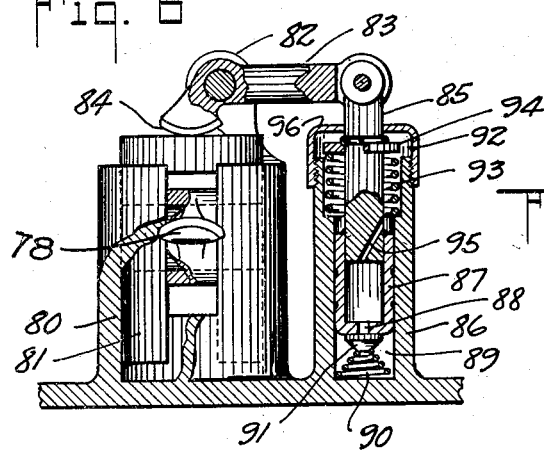
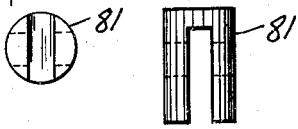
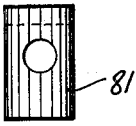
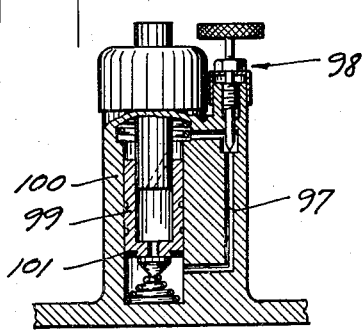

1,955,844

UNITED STATES PATENT OFFICE 1,955,844

VALVE CONTROL MECHANISM

Nelson E. Woolman, Hermosa Beach, Calif., assignor to General Motors Research Corporation Application April 2, 1932, Serial No. 602,856

2 Claims. (Cl. 123—90)

This invention relates to valves, and more particularly to a mechanism for operating and closing the same. It is especially applicable to valves used in conjunction with internal combustion engines, such as poppet valves, controlling inlet and outlet ports for the engine cylinders.

In my prior application, Serial No. 311,534, filed October 10, 1928 and entitled "Rocker arm mechanism", I disclose a scheme for operating such valves in an improved manner, which provides a smooth, noiseless operation of the valve mechanism.

In the conventional internal combustion engine, the poppet valve has a stem portion that projects out of the cylinder block, and a strong spring is used for urging the valve back to its normal position. By the aid of a cam arrangement operated from the engine shaft, the stem is operated upon to overcome the force of the spring and to operate the valve. Temperature changes in the mechanism, which are inevitable in internal combustion engines, produce variations in the length of the stem and the push rod, and for this reason, it is common to allow a slight clearance between these parts when the engine is cold.

This clearance is difficult to adjust, and if too great, the valves are not operated in proper sequence with the cams; and very noisy click results. If too small, the expansion of the push rod and valve stem on temperature rise may be sufficient to prevent the valve from returning to its normal closed position under the influence of its spring.

In my prior application, I obviate this by means of a rocker mechanism, the axis of which is floating, one arm of the rocker actuating the valve stem and the other arm being actuated in time with the engine cycle, said arm being capable of adjusting itself to all temperature conditions. This is shown as accomplished by the aid of a dash pot mechanism using a fluid such as oil. When the cam operates the valve, the dash pot acts to permit the cam to transfer its force without lost motion to the valve; and the dash pot arrangement acts to keep the parts in contact without lost motion.

It is an object of my invention to modify the above construction by virtue of a direct action of the cam on the rocker arm.

It is a further object of my invention to employ a resilient support for my rocker arm which is capable of a limited and difficult movement in one direction and a free movement in the opposite direction, which is brought about by a close fit of a dash pot plunger or piston with the side walls of the cylinder.

It is another object of my invention to employ a floating fulcrum for the rocker arm device, which will impart a constant pressure to the pad against the valve stem and push rod and thus keep these parts in constant contact.

I accomplish this result by providing a rocker arm, the axis of which is not definitely fixed, but is rather so arranged that it can move slightly against a slow acting buffer or damper, such as a fluid cylinder, herein termed a dash pot.

In my said prior application, the rocker arm axis can adjust itself to the other parts of the valve mechanism by virtue of a pair of telescoping members that utilize oil or some other fluid, the degree of motion of the level of the rocker arm axis being the same as that of the relatively movable telescoping members. In my present arrangement the mechanism is so arranged that a comparatively large motion of the telescoping parts is secured, thereby facilitating the adjustment and manufacture of these parts.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a detailed sectional view of my device shown as mounted on a cylinder head, with overhead cam shaft;

Fig. 2 is a pictorial view of one of the parts utilized in the form of my invention shown in Fig. 1;

Fig. 3 is a detailed sectional view of my device shown as applied to an L head motor;

Fig. 4 is a plan view of a portion of an engine employing a different form of valve mechanism, and utilizing a modified form of my invention;

Fig. 5 is a sectional view taken along the plane 5—5 of Fig. 4;

Fig. 6 is a sectional view taken along the plane 6—6 of Fig. 4;

Fig. 7 is an elevation of a piston or plunger used in connection with the form shown in Figs. 4, 5 and 6;

Figs. 8 and 9 are bottom and side views respectively, of the piston; and

Fig. 10 is a modification of a portion of the mechanism shown in Fig. 6.

In the form of my invention shown in Fig. 1, a portion of the cylinder head 21 is shown in cross-section. This comprises the conventional piston 22 and cylinder 23 surrounded by cooling chambers or water jacket 24 and 25. I show a valve 26 in the head urged by a strong spring 27 to a closed position, controlling communication from the cylinder 23 to a passage 28 which may lead either to an exhaust or intake manifold or passageway. It is of course to be understood that valve 26 exemplifies one of a plurality of exhaust and intake valves, and that the rocker arm structure that will be later described can be indiscriminately applied to all of the valves, whether intake or exhaust.

Valve 26 has a stem 29 that extends out of the head, and which can be depressed against the action of the spring 27 to open the valve. The spring 27 is held in place on the valve stem 29 by means of a flange 30 held in place by a pin 31. In order to open the valve 26, I provide a rocker arm 32 arranged to be moved from a shaft 33 as its axis. This axis, as will be hereinafter described, is floating, and its level is capable of a slight movement.

The rocking action of the rocker is provided by the direct action of a cam 34 on the cam shaft 34' in timed cycles in a well understood manner. The arm 32 contacts with the valve stem 29 by means of a pad 35 and thus it is apparent that the contact of the low point of the cam 34 with the arm 32 will depress the valve 26 against the action of the spring 27 and thus open the valve.

In order to assure the constant contact of the pad 35 with the valve stem 29, I provide a mechanism comprising what will herein be termed a piston 36 and a cylinder 37, which permits the axis of shaft 33 to move as required, for taking up any play between pad 35 and stem 29. An enlarged view of the piston 36 is shown in Fig. 2. The arm 32 is pivoted on the shaft 33 passing through the side walls of the piston as at 38. The piston is held in a comparatively stationary position by means of a strong spring 39 resting on the bottom of the cylinder 37 which is filled with a fluid such as oil. The important feature of this dash pot is the ease and swiftness in which the piston springs back into its normal position after the arm 32 has been depressed by the high point of the cam 34. This is brought about by the combined action of the compressed spring 39 and the fluid acting against the lower end of the piston 36 when the pressure on the rocker arm 32 is removed. Spring 39 further acts to raise pivot shaft 33 so as to insure the contact of the pad 39' with the cam 34 at all times. To produce this effect, the point of contact between the stem 29 and the pad 35 acts as the fulcrum about which the arm 32 moves.

The piston 36 being in fairly close contact with the side walls of the cylinder 37 permits only a very slow escape of the oil between the contacting walls of the piston 36, the cylinder 37 and the oil rings 40. Therefore, when the arm 32 is depressed by cam 34, the fluid in combination with the spring 39 holds the piston comparatively stationary and the little oil that is forced up between the side walls, flows into the hollow space 36'. After the cam 34 has passed the low point, the pressure on the arm 32 is released, the piston 36 carrying the arm rises and in doing so, creates a vacuum in the cylinder space 37, which overcomes the spring action holding a valve 41 in place and thus permits the oil from space 36' back into the cylinder 37. The construction of this valve and spring is similar to that described in my prior application, and consists of a valve and stem 41 urged to closing position by a spring 42 which is fastened to the stem by means of a flange or washer 43 and a pin 44. Thus the efficacy of this arrangement becomes apparent as there is a continual pressure on the arm 32 which assures constant contact of the pad 35 with the valve stem 29.

This feature is of prime importance, as it dispenses with the necessity of a space allowance between the pad 35 and valve stem 29, or between the high point of cam 34 and pad 39; to compensate for the expansion and contraction of the metallic parts due to the heating and cooling thereof while the engine is running. The constant clicking between these parts as is common in the automobile engine is thus eliminated.

The operation of the device is readily apparent from the foregoing. The spring 39 always acts rapidly in an upward direction to keep the arm 32 in constant contact with the valve stem 29 and the pad 39' with the cam 34, but has not sufficient force to overcome the resistance of the spring 27. However, by virtue of the action of the high point of the cam on the arm 32, the pad 35 contacting with the valve stem is depressed twice as much as the end held in place by the combined effect of the fluid and spring 39 and accordingly the resistance of the spring 27 is overcome and the valve 26 is opened. This is readily apparent from an inspection of the drawings, as the arm 32 in its downward movement acts about the shaft 33 as a fulcrum and the forward end thereof moves a comparatively great distance for a correspondingly smaller movement of the arm at the fulcrum due to the leverage of the arm at its forward end. The mechanism is shown as included within a casing 45.

The embodiment of my invention is not necessarily limited to the overhead type of motor and lends itself very readily to the L head motor This embodiment I have clearly shown in Fig. 3, which form of the invention I shall now describe. As heretofore, I employ the conventional piston 50 and the cooling chambers 51, 52 and 53. I here disclose a valve 54 urged by a strong spring 55 to a closed position interrupting communication between the passageways 56 and 57. As before, it is to be understood that the valve 54 is one of a plurality of exhaust and intake valves, and that the rocker arm structure is one that can be indiscriminately applied to all the valves, whether intake or exhaust.

Valve 54 has a stem 58 extending from the head and which can be depressed against the action of the spring 55 to open the valve. The spring 55 is held in place by means of a flange 59 held to the stem 58 by a pin 60 passing therethrough. The means of opening the valve 54 and of keeping the pad 61 in constant contact with the valve stem 58 are essentially the same as has already been described in regard to Fig. 1, and comprises the rotating cam 62 acting on the arm 63 which moves about the shaft 64 as its axis. However, here the dash pot is differently arranged and constructed due to its location with respect to the valves.

The dash pot, as in Fig. 1, comprises a piston or plunger 65 having oil grooves 66 on its periphery and a cylinder 67 filled with oil. When the high point of the cam raises the arm 63, the upward motion thereof is translated from the shaft 64 to piston 65, and thus oil is forced from the cylinder 67 between the side walls of the cylinder and the piston and from there into the casing. Here, the oil does not return to the chamber 68 and accordingly I supply a means of keeping this chamber full of oil. To accomplish this, I provide an orifice 69 leading to an oil supply (not shown) which permits oil to flow into the chamber 68 when the spring 70 forces the piston 65 downwards. In the upward movement of the piston, a metal ball valve 72 carried by a spring 71 is forced against the opening, thus permitting no oil to enter and forcing the excess oil, caused by the decrease in size of the chamber 68 to be forced down past piston 65, as has been already described. The operation and the advantages of this mechanism in other respects are similar to that of Fig. 1.

In the form of my invention illustrated in Figs. 4 to 9, I show an embodiment in which an additional lever is used to connect the take up device to the rocker arm whereby the relative movement thereof is increased. In this form the rocker arm 73 is pivoted on the shaft 74, and its rocking action is provided by the action of a push rod 75 that is pushed upwardly in proper cyclical sequence by a cam shaft (not shown) in a well understood manner. This push rod in the present instance is shown as formed with a socket 76 at its upper extremity, into which fits a ball 77.

The opposite end of arm 73 is provided with a pad 78 arranged to engage valve stem 79. It is evident that an upward movement of rod 75 causes a corresponding depression of stem 79 against the resistance of spring 80', and the valve (not shown) opens.

In order to keep the pad 78 in constant contact with the stem 79, I provide a mechanism acting resiliently on the axis of arm 73. This includes a housing 80 containing a bifurcated sleeve guide 81 through which the shaft 74 passes. Integral with the housing 80 are a plurality of ears 82 carrying a T shaped member 83 which extends laterally backwards and which is pivotally attached to the piston stem 85 of a retarding mechanism. The forward end of this T shaped member 83 depends onto the sleeve guide 81 and is formed as a cam 84. Piston stem 85 slides in the casing or cylinder 86 of a dash pot. Joined to the piston stem 85 is a hollow piston 87 having an opening 88 therein for a purpose which will be hereinafter brought out. An upward movement of the connecting rod 75 urges sleeve 81 against cam 84 and thereby provides a force urging piston 87 into cylinder 86. The oil, entrapped in the space 89 by the valve 91, closes aperture 88, and prevents material movement of piston 87, since the only egress of the oil is between the side walls of the cylinder 86 and the piston 87 into a chamber 92. This chamber contains a strong spring 93 fastened to the stem 85 by means of a collar 94 for urging the piston 87 upwards. A downward movement of the push rod 75 permits spring 80 to act and thus rotate the rocker arm in the opposite direction. Any tendency for sleeve 81 to move out of contact with pad 84 during this action is quickly taken care of by the take-up mechanism. Thus oil from the chamber 92 flows through the channelway 95 and thus back into the chamber 89 by virtue of the vacuum formed as heretofore explained. Thus it will be readily seen that this dash pot mechanism operates in the same manner as heretofore, by continually imparting sufficient pressure to keep the pad 78 and the valve stem 79 in constant contact. The top of this dash pot is enclosed by an internally threaded cap 96 screwing onto the external threads on the cylinder.

In Fig. 10, I have shown a modification of the dash pot arrangement of Fig. 6. Essentially, the operation is the same, but the oil from the lower chamber is forced to the upper chamber by means of an adjustable by-pass 97. The adjusting mechanism comprises the conventional needle point valve mechanism, designated as a whole by 98. As a means of preventing the passage of the oil between the side walls of the vessel 99 and the cylinder 100, I use a packing 101 fitted in the lower portion of the vessel 99, and in close contact with the inner wall of the cylinder 100.

I claim:

1. In valve operating mechanism the combination of a rocker arm, a pivot for the rocker arm, a reciprocating member carrying the pivot, a guide for said member, a lever, a fulcrum for the lever, said lever having an arm bearing upon the reciprocating member, a dashpot supporting the other end of the lever, and a spring yieldingly urging the dashpot out of its cylinder and through said lever putting pressure on said pivot to urge the rocker arm in a direction to take up slack in the system.

2. In the combination as defined in claim 1, the fulcrum for said lever being journalled in the guide for said reciprocating member.

NELSON E. WOOLMAN.